United States Patent [19]

Tanahashi et al.

[11] 4,250,708
[45] Feb. 17, 1981

[54] EXHAUST DOUBLE PIPE OF AN INTERNAL COMBUSTION ENGINE

[75] Inventors: Toshio Tanahashi; Yasuo Fujioka, both of Toyota, Japan

[73] Assignee: Toyota Jidosha Kogyo Kabushiki Kaisha, Toyota, Japan

[21] Appl. No.: 971,238

[22] Filed: Dec. 20, 1978

Related U.S. Application Data

[62] Division of Ser. No. 704,510, Jul. 12, 1976, Pat. No. 4,142,366.

[30] Foreign Application Priority Data

May 18, 1976 [JP] Japan ................................ 51/56025

[51] Int. Cl.³ .......................... F01N 7/00; F16L 11/00
[52] U.S. Cl. ........................................ 60/322; 138/148
[58] Field of Search ................ 60/322, 288, 299, 282; 138/148

[56] References Cited

U.S. PATENT DOCUMENTS

| | | |
|---|---|---|
| 2,775,470 | 12/1956 | Bixler ............................ 60/322 |
| 3,850,453 | 11/1974 | Bentley ......................... 60/322 |
| 4,031,700 | 6/1977 | Yamazaki ...................... 60/322 |

*Primary Examiner*—Douglas Hart
*Attorney, Agent, or Firm*—Stevens, Davis, Miller & Mosher

[57] ABSTRACT

An exhaust double pipe used for interconnecting an exhaust manifold with a catalytic converter of an internal combustion engine, comprising an inner pipe and an outer pipe. The outer pipe comprises a first pipe and a second pipe. The outer end of the first pipe is welded to a flange together with one end of the inner pipe. The outer end of the second pipe is welded to another flange together with the other end of the inner pipe. The inner end of the first pipe is directly fitted into the inner end of the second pipe, or is indirectly connected to the inner end of the second pipe via a spacer so as to be able to slide relative to the second pipe.

1 Claim, 11 Drawing Figures

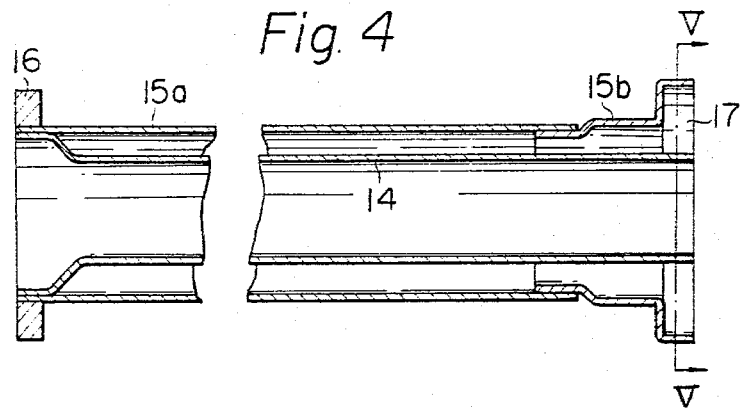
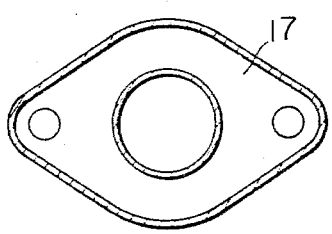
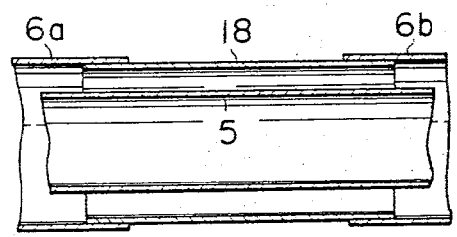
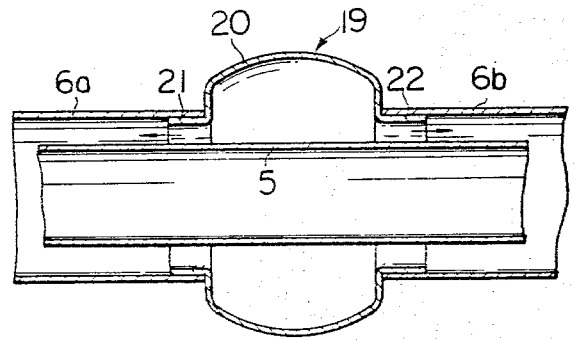

EXHAUST DOUBLE PIPE OF AN INTERNAL COMBUSTION ENGINE

This is a Division of application Ser. No. 704,510 filed July 12, 1976, now U.S. Pat. No. 4,142,366.

DESCRIPTION OF THE INVENTION

The present invention relates to an exhaust double pipe of an internal combustion engine. In order to retain the heat of the exhaust gas flowing from the exhaust manifold towards the catalytic converter, the exhaust pipe connecting the exhaust manifold with the catalytic converter is usually formed so as to have a double pipe construction comprising an inner pipe for passing the exhaust gas therethrough and an outer pipe for retaining the heat of the inner pipe. In an exhaust pipe of this type, the inner pipe is heated by the exhaust gas flowing therein and having a high temperature, and thus the temperature of the inner pipe becomes extremely high, while the outer pipe is cooled by the atmosphere, and thus the temperature of the outer pipe is relatively low. Consequently, a difference in the amount of thermal expansion occurs between the inner pipe and the outer pipe. In a conventional exhaust pipe, taking the above-mentioned difference into consideration, one end of the inner pipe and one end of the outer pipe are welded to a mounting flange, while only the other end of the outer pipe is welded to another mounting flange, the inner pipe being supported by a spacer which is inserted between the inner and the outer pipes. However, as aforementioned, since a difference in the amount of thermal expansion occurs between the inner and the outer pipes, slippage takes place between the spacer and the inner and the outer pipes. As a result of this, the outer surfaces of the inner pipe and the spacer wear away, and thus a gap is created between the inner pipe and the spacer. Then, the vibration of the engine causes the gap to broaden and, finally, there is the disadvantage that a hole may be created in the inner pipe. In addition, there is a further disadvantage that the exhaust gas enters into the gap between the inner and the outer pipes from the open end of the inner pipe, whereby the ability to retain the heat of inner pipe is reduced.

An object of the present invention is to eliminate above-mentioned disadvantages.

According to the present invention, there is provided an exhaust double pipe in an internal combustion engine having an exhaust manifold and a catalytic converter in an exhaust system, said exhaust double pipe comprising an inner pipe, an outer pipe, a first flange mounted on one end of said exhaust double pipe for connecting the exhaust double pipe with an outlet of the exhaust manifold, and a second flange mounted on the other end of said exhaust double pipe for connecting the exhaust double pipe with an inlet of the catalytic converter, wherein the improvement comprises outer pipe means comprising a first pipe, a second pipe and a spacer interconnecting the first pipe with the second pipe, the outer end of the first pipe being welded to said first flange together with one end of said inner pipe, the outer end of said second pipe being welded to said second flange together with the other end of said inner pipe.

The above-mentioned object of the present invention may be more fully understood from the following descriptions of a preferred embodiment of the invention, together with the accompanying drawings.

BRIEF DESCRIPTION OF THE DRAWINGS

In the drawings:

FIG. 4 is a cross-sectional side view of another embodiment;

FIG. 5 is a cross-sectional side view, in part, of a further embodiment;

FIG. 6 is a cross-sectional side view, in part, of a still further embodiment;

FIG. 7 is a cross-sectional side view, in part, of a still further embodiment;

DESCRIPTION OF A PREFERRED EMBODIMENT

Figure 1:
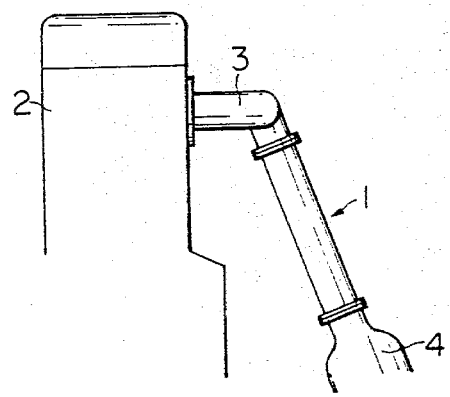
FIG. 1 is a schematic view of an internal combustion engine having an exhaust double pipe according to the present invention.

As is shown in FIG. 1, an exhaust double pipe 1 according to the present invention is used for interconnecting an exhaust manifold 3 fixed to an engine body 2 with a catalytic converter 4.

Figure 2:
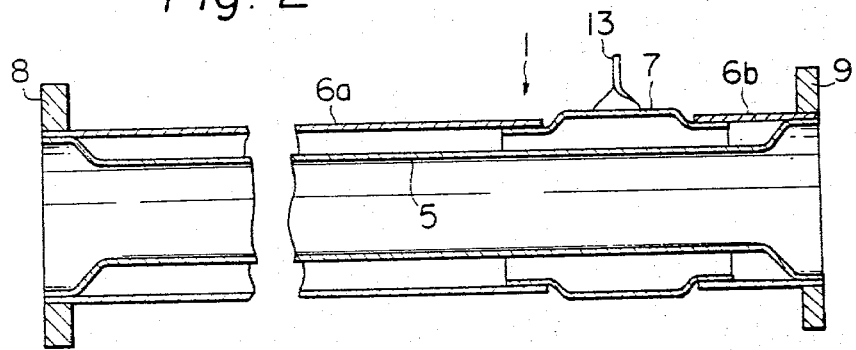
FIG. 2 is a cross-sectional side view of an exhaust double pipe according to the present invention.

Referring to FIG. 2, the exhaust double pipe 1 comprises an inner pipe 5, a pair of outer pipe portions 6a and 6b, a spacer 7, and a pair of mounting flanges 8 and 9. The opposite ends of the inner pipe 5 are expanded to an extent equal to the inner diameters of the outer pipe portions 6a and 6b, and are respectively welded to the flanges 8 and 9 together with the outer ends of the out pipe portions 6a and 6b.

Figure 3:
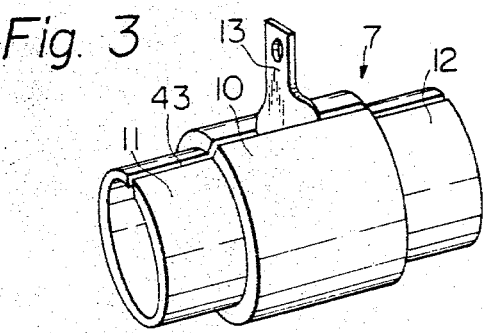
FIG. 3 is a perspective view of a spacer.
Figure 11:
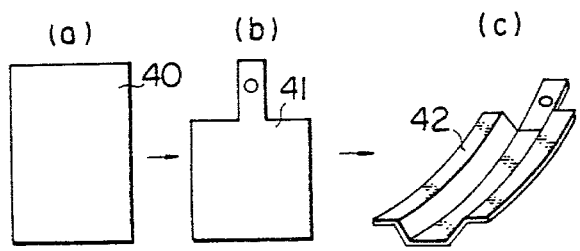
FIG. 11 is a view showing a manufacturing process of a spacer.

FIG. 3 shows a perspective view of the spacer 7. The spacer 7 has on its central portion an increased diameter portion 10 and on its opposite ends reduced diameter portions 11 and 12. The outer pipe portions 6a and 6b are fitted onto the outer peripheral walls of the reduced diameter portions 11 and 12, respectively. A support piece 13 for supporting the exhaust double pipe 1 is formed on the increased diameter portion 10. The support piece 13 is fixed to the body of a vehicle. Furthermore, the spacer 7 can be easily formed from a sheet of metal by a machining operation. That is to say, referring to FIG. 11, a process of manufacturing the spacer comprises the steps of forming an original blank 41 by cutting a sheet of metal 40, forming a blank 42 shown in FIG. 11(c) by bending the original blank 41, and forming the spacer 7 shown in FIG. 3 by further bending the blank 42. Consequently, a gap 43 is necessarily formed on the spacer 7. In addition, in FIG. 3, the spacer 7 may be formed from a sheet of bimetallic metal. In this case, the spacer 7 has a tendency to expand outwards in accordance with an increase in the temperature of the spacer 7 after the engine is started. Consequently, after completion of warm-up of the engine, the reduced diameter portions 11 and 12 of the spacer 7 fixed to the body of a vehicle via the support piece 13 are tightly fitted into the outer pipe portions 6a and 6b, thus preventing the exhaust double pipe from vibrating when the vehicle is driven.

In FIG. 2, since the outer pipe portions 6a and 6b and the spacer 7 are cooled by the atmosphere, the temperature of the outer pipe portions 6a and 6b and the temperature of the spacer 7 are relatively low, and the contact area between the spacer 7 and the outer pipe portions 6a and 6b is relatively wide. Therefore, the amount of wear caused by the contact of the spacer 7 with the outer pipe portions 6a and 6b is extremely small. In addition, vibration of the exhaust double pipe 7 is prevented by fixing the support piece 13 to the body of a vehicle. In order to further reduce the amount of wear caused by the contact of the spacer 7 with the outer pipe portions 6a and 6b, it is preferable that an aluminium-plated iron be used as the material of the outer pipe portions 6a and 6b, and a stainless steel be used as the material of the spacer 7.

An exhaust double pipe may be formed so as to have a construction as shown in FIG. 4. Referring to FIG. 4, one end of an inner pipe 14 is welded to a flange 16 together with the outer end of an outer pipe portion 15a, and the other end of the inner pipe 14 is welded to a flange 17 together with the outer end of an outer pipe portion 15b. The inner end portion of the outer pipe portion 15 b is fitted into the outer pipe portion 15a so as to be able to slide relative to the outer pipe portion 15a.

FIG. 6 through FIG. 9 show various embodiments of spacers. Referring to FIG. 6, a spacer 18 comprises a cylindrical straight pipe. One end of the spacer 18 is fitted into the outer pipe portion 6b and welded to it, while the other end of the spacer 18 is fitted into the outer pipe portion 6a so as to be able to slide relative to the outer pipe portion 6a.

Referring to FIG. 7, a spacer 19 has on its central portion a barrel shaped portion 20, and has on its opposite ends reduced diameter portions 21 and 22. The outer pipe portions 6a and 6b are fitted onto the outer peripheral walls of the reduced diameter portions 21 and 22, respectively. The barrel shaped portion 20 functions as a spring member which causes the reduced diameter portions 21 and 22 to expand in the respective directions shown by the arrows in FIG. 7. Consequently, if the distance between the outer pipe portions 6a and 6b is changed, there is no danger such that the spacer 19 will be loosened.

Figure 8:
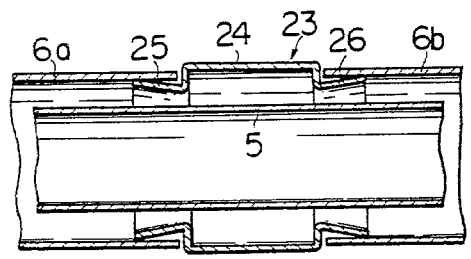
FIG. 8 is a cross-sectional side view, in part, of a still further embodiment.

Referring to FIG. 8, a spacer 23 has on its central portion an increased diameter portion 24, and has on its opposite ends conical portions 25 and 26 expanding outwards. The conical portions 25 and 26 are fitted into outer pipe portions 6a and 6b, respectively, so as to be able to slide relative to the outer pipe portions 6a and 6b.

Figure 9:
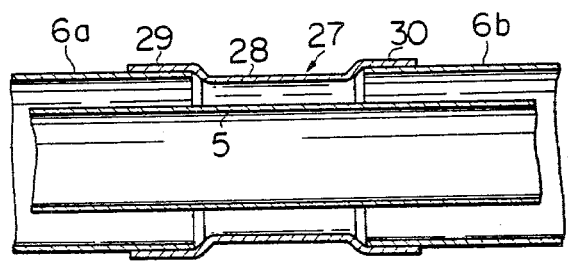
FIG. 9 is a cross-sectional side view, in part, of a still further embodiment.

Referring to FIG. 9, a spacer 27 has on its central portion a reduced diameter portion 28, and has on its opposite ends increased diameter portions 29 and 30. Outer pipe portions 6a and 6b are fitted into the increased diameter portions 29 and 30, respectively, so as to be able to slide relative to the increased diameter portions 6a and 6b.

Figure 10:
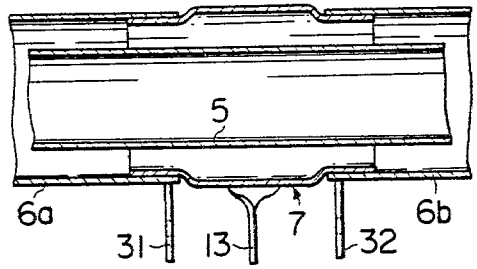
FIG. 10 is a cross-sectional side view, in part, of a still further embodiment.

Referring to FIG. 10, a pair of support pieces 31 and 32 are further formed on the outer walls of the inner ends of the outer pipe portions 6a and 6b in addition to the support piece 13. The support pieces 31 and 32 are also fixed to the body of a vehicle. When the inner pipe 5 is expanded, the outer pipe portion 6a moves relative to the outer pipe portion 6b. Consequently, it is preferable that the support pieces 31 and 32 be made of a resilient material. In this embodiment, the exhaust double pipe 7 can be fixed to the body of a vehicle by means of three support pieces 13, 31 and 32, thus completely preventing the exhaust double pipe from vibrating.

As is hereinbefore mentioned, in any of the embodiments according to the present invention, since the opposite ends of the inner pipe are welded to the mounting flanges, there is no danger of the exhaust gas entering into the gap between the inner pipe and the outer pipe and, as a result, the heat of the inner pipe is effectively retained. Furthermore, there is no contact portion between the inner pipe and the outer pipe, thus preventing the creation of a hole in the inner pipe.

What is claimed is:

1. A double-walled exhaust pipe for use with an internal combustion engine of a vehicle comprising:
   an inner exhaust pipe having first and second ends,
   an outer pipe assembly surrounding said inner pipe, said outer pipe assembly comprising first and second outer pipes, each having inner and outer ends, said inner end of said first outer pipe being coupled to said inner end of said second outer pipe,
   said first and second outer pipes are spaced from and define a continuous air gap with the inner pipe over substantially the entire length of the first and second outer pipes except at the outer ends thereof, the inner end of one of said outer pipes has a reduced diameter portion such that said one outer pipe is slidably fitted in contact with and within the inner end of the other outer pipe with the inner ends of the first and second outer pipes spaced from the inner pipe via the air gap and said reduced diameter portion of said one outer pipe has an outside diameter substantially equal to the inside diameter of said other outer pipe,
   a first mounting flange, said outer end of said first outer pipe being welded to said first mounting flange together with said first end of said inner pipe, and
   a second mounting flange, the outer end of said second outer pipe being welded to said second mounting flange together with said second end of said inner pipe, said second outer pipe being not directly connected to said inner pipe.

* * * * *